Figure 10:
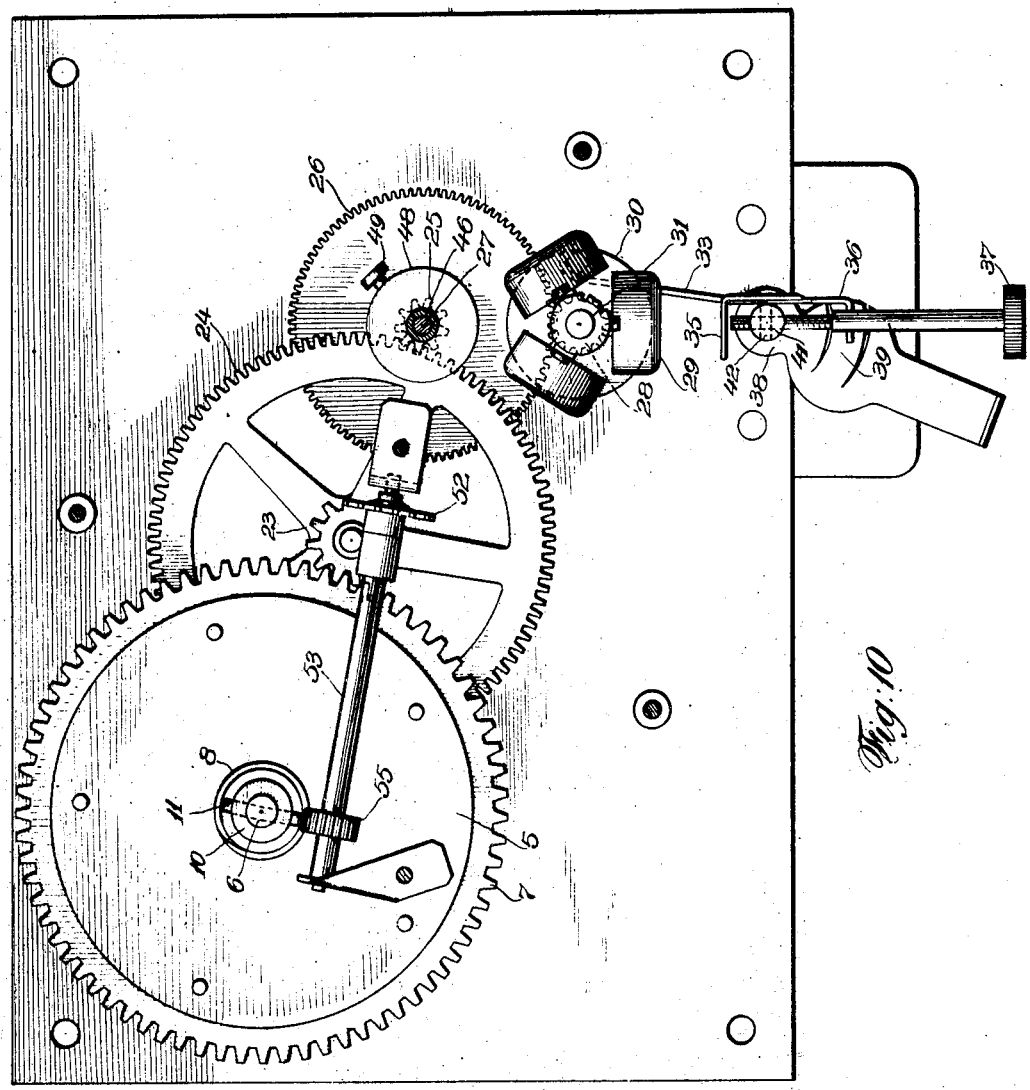

No. 897,836. PATENTED SEPT. 1, 1908.
E. F. LEEDS & G. RUMPF.
PHONOGRAPH.
APPLICATION FILED JAN. 18, 1908.
5 SHEETS—SHEET 1.
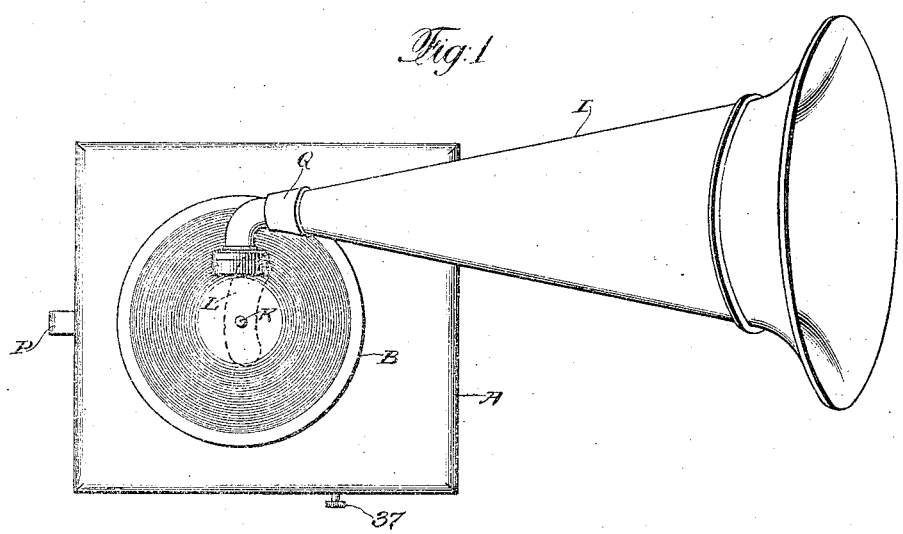
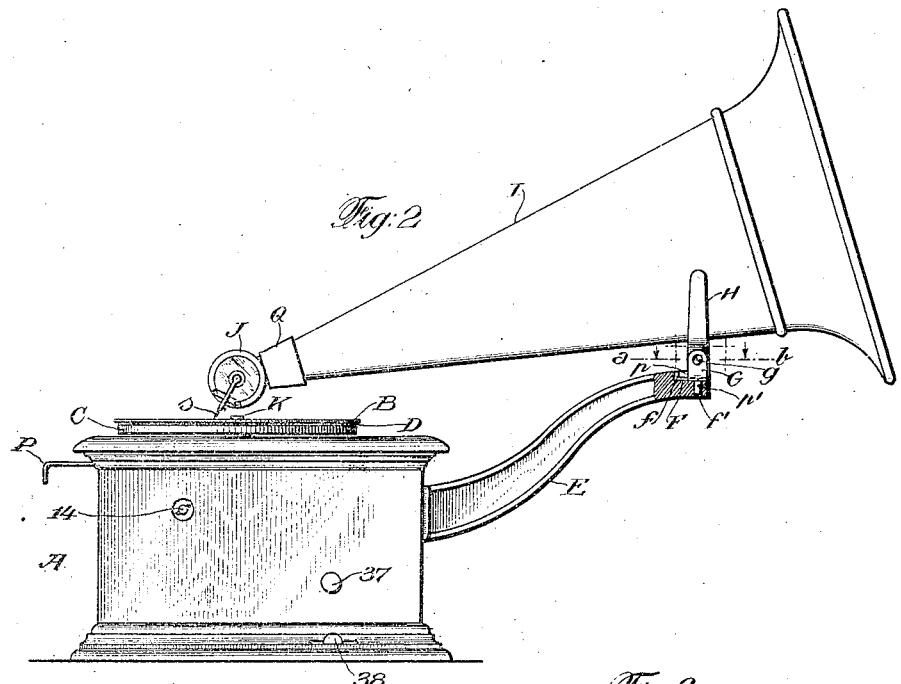

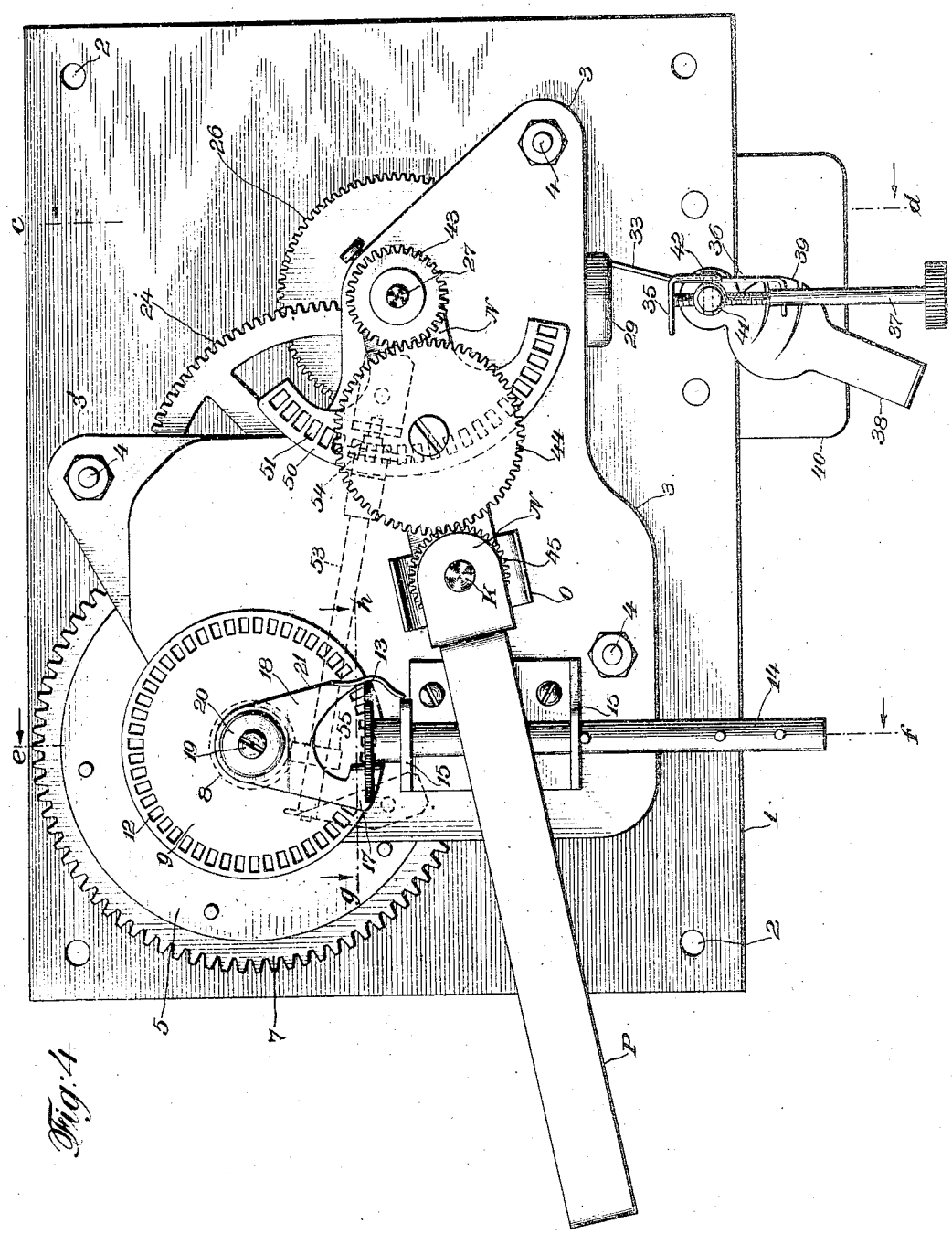

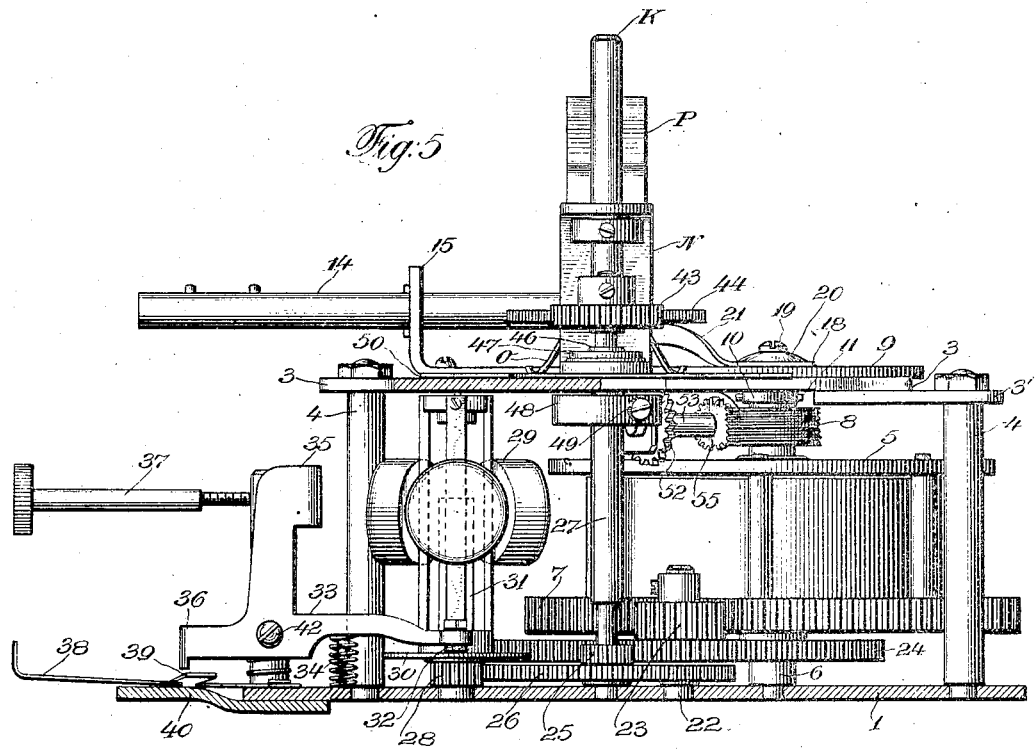

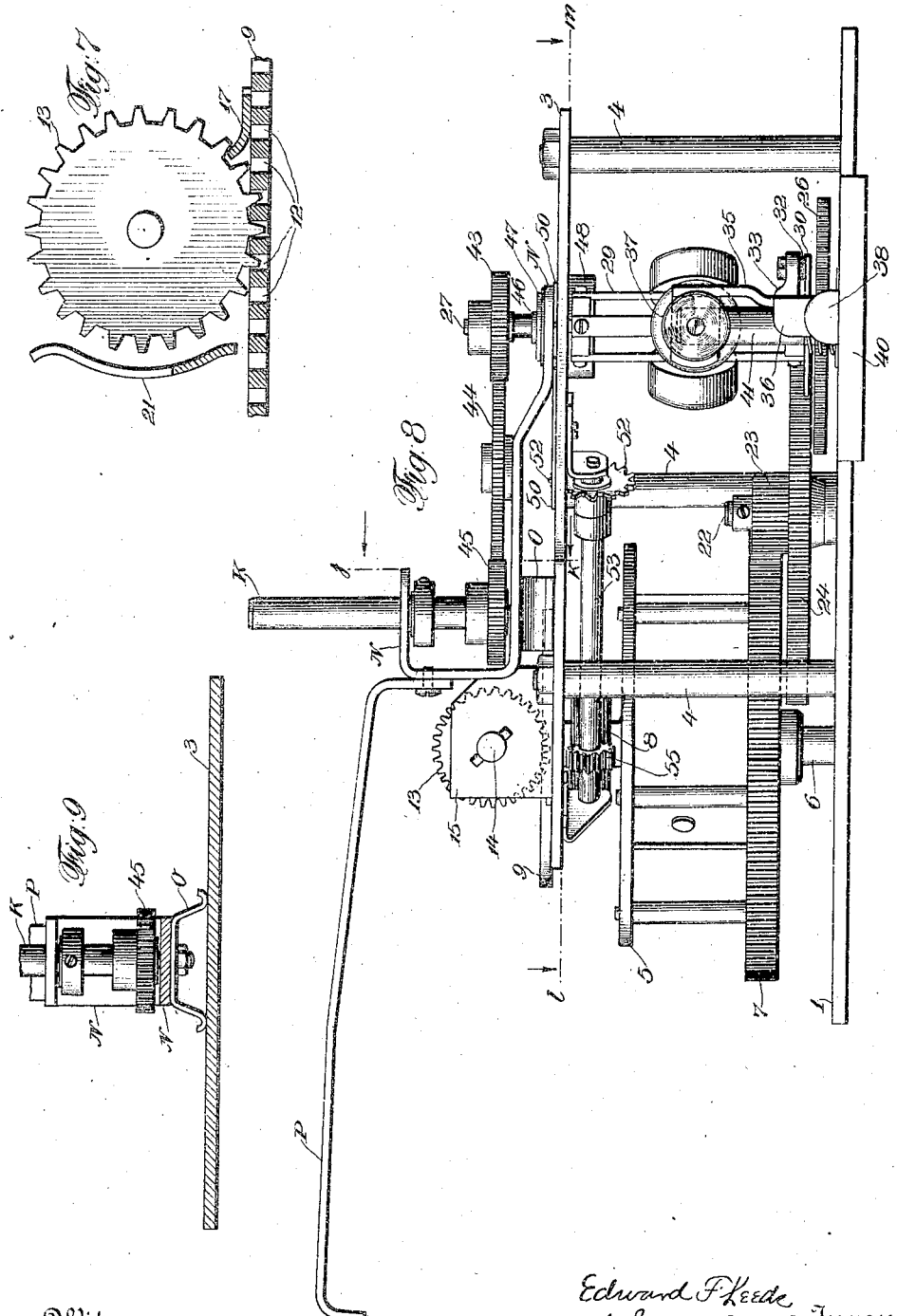

No. 897,836. PATENTED SEPT. 1, 1908.
E. F. LEEDS & G. RUMPF.
PHONOGRAPH.
APPLICATION FILED JAN. 18, 1908.

5 SHEETS—SHEET 5.

Witnesses:

Edward F Leeds
and George Rumpf Inventors
By their Attorney Louis Hicks

UNITED STATES PATENT OFFICE.

EDWARD F. LEEDS AND GEORGE RUMPF, OF NEW YORK, N. Y.; SAID RUMPF ASSIGNOR TO SAID LEEDS.

PHONOGRAPH.

No. 897,836.    Specification of Letters Patent.    Patented Sept. 1, 1908.

Application filed January 18, 1908. Serial No. 411,425.

*To all whom it may concern:*

Be it known that we, EDWARD F. LEEDS and GEORGE RUMPF, citizens of the United States, residing, respectively, in the county of Kings and in the county of New York, city and State of New York, have invented new and useful Improvements in Phonographs, of which the following is a specification.

This invention relates to phonographs for recording and reproducing sound wherein the tablet of material suitable for recording sound, or the tablet having a sound-record made thereon, revolves and, at the same time, passes across and is fed to the point of the sound-recording or of the sound reproducing stylus by virtue of suitable mechanism, and has for its object the construction, in a cheap and practical manner, of a phonograph of the kind described embodying the improvements and advantages hereinafter described with reference to the drawings which form part of this specification.

Referring to the drawings, Figure 1 is a plan view, and Fig. 2 is an elevation, partly in vertical section, of a phonograph made in accordance with this invention. Fig. 3 is a plan view, partly in horizontal section along the line $ab$, of a detail of the phonograph shown in Fig. 2. Fig. 4 is a plan view of the mechanism within the box of the phonograph shown in Figs. 1 and 2. Fig. 5 is an elevation, partly in vertical section along the line $cd$, of mechanism shown in Fig. 4. Fig. 6 is an elevation, partly in vertical section along the line $ez$, of mechanism shown in Fig. 4. Fig. 7 is an elevation, partly in developing section along the line $gz$, of a detail of the mechanism shown in Fig. 4. Fig. 8 is an elevation of the mechanism shown in Fig. 4, viewed from the right side thereof. Fig. 9 is an elevation, partly in vertical section along the line $jz$, of a detail of the mechanism shown in Fig. 8. Fig. 10 is a plan view of that part of the mechanism shown in Fig. 8 which is below the line $lz$.

Referring to Figs. 1 and 2, A is a box, of any suitable shape and material, in which the greater part of the mechanism of the phonograph is preferably placed. B is a record-tablet, shown in the form of a disk having a sound-record made thereon. The record-tablet B may, however, consist of sound-recording material and be of any suitable shape or size. C is a suitable support for the record-tablet B and may, as shown, consist of a disk of metal provided, preferably, with a covering D of felt or other suitable material upon its surface next to the tablet B. E is an arm secured to and extending from, one side of the box A. The arm E may be provided at its end with a cavity F, having recesses or sockets $f$ and $f'$, as shown in Figs. 2 and 3. G is a bifurcated piece provided with two pins $p$ and $p'$, entering and fitting respectively into the sockets $f$ and $f'$, and with a pivot $g$ upon which the bracket H, which supports the horn I, turns vertically. J is a sound-recorder or a sound-reproducer adjusted at the small end of the horn I and provided with a diaphragm and with a stylus $s$ that vibrates vertically, or, as shown, that vibrates laterally in the recording and reproducing of sound. K is a revoluble shaft extending up through the top of the box A and carrying the metal plate C, together with the tablet B. L is an opening, oblong and slightly curved, as shown by dotted lines in Fig. 1, in the top of the box A to permit the to and fro, lateral or transverse motion of the revoluble shaft K, which, when it revolves, moves transversely and causes plate C and tablet B in like manner to revolve and to move transversely and thus to pass across the point of the sound-recording or of the sound-reproducing stylus. As hereinafter shown, the revoluble shaft K moves transversely in the arc of a circle.

The stylus $s$ of the sound-box J is free to move up and down or vertically by virtue of the pivot $g$ upon which the bracket H, which carries the horn I, turns. As shown in Figs. 1 and 2 the connection between the small end of horn I and sound-box J may consist of a rubber tube Q, the flexibility of which will permit stylus $s$ to adjust itself automatically to the thread or groove of a sound-record and to gravitate to the bottom of the groove; or as shown in Figs. 2 and 3, the pin $p$ need not quite fill the recess $f$, so that the part G is capable of a slight lateral motion by the turn of the pin $p'$ in its socket $f'$, whereby the stylus $s$ of the sound-box J is capable of such slight lateral motion as will enable it, in like manner, to adjust itself automatically to the thread or groove of a sound-record and gravitate to the bottom of the groove. Since the threads or grooves of a sound-record approximate 100 to the inch, the lateral motion of the stylus *s*, permitted by lateral movement of the rubber tube Q or of the pin *p* in the recess *f*, necessary to permit the stylus to adjust itself automatically to the record-groove and to gravitate to the bottom thereof, is so slight that the stylus is, with regard to lateral motion, practically fixed or stationary.

The mechanism by virtue of which tablet B, resting upon plate C and revolving with shaft K, is permitted to pass across the point of stylus *s*, and in such manner that stylus *s* would, if tablet B did not revolve but moved only transversely, describe the arc of a circle in suitable recording material upon the surface of tablet B, is illustrated in the remaining Figs. 4–10 of the drawings and described as follows,—1 is a bed-plate provided with screw-holes 2 at the corners for the passage of screws to secure the bed-plate to the bottom of box A. 3 is a plate parallel to and elevated above bed-plate 1 and supported by three standards 4. In Fig. 8 plate 3 is shown as consisting of a single piece of metal, while in Figs. 4, 5 and 6 it is shown as consisting of two pieces, 3 and 3'. 5 is a casing containing a motor or main spring which is attached at one end to and winds about a vertical shaft 6. The casing 5 is provided with a gear-wheel 7 and a worm 8 which revolve with the casing under the action of the spring, as is well understood, and, respectively, communicate motion to the two principal, operative systems or parts of the machine. Attached to the upper end of shaft 6, above plate 3, is a wheel 9. The wheel 9 is provided on its lower side with a cylindrical piece or sleeve 10 which surrounds shaft 6, passing through plate 3, and engages a pin 11, which passes through shaft 6. The periphery of wheel 9 is provided with perforations 12, shown in Fig. 4, or with a crown gear or ring of vertical cogs instead of the perforations 12. The cogs or perforations 12 on the periphery of wheel 9 are engaged by gear-wheel 13 which revolves at the end of shaft 14. The shaft 14 revolves in bearings in the standards 15 and is provided with one or more projections 16 to engage a key adapted to enter the hole in the side of the box shown in Fig. 2 and turn or revolve shaft 14. When shaft 14 revolves, gear-wheel 13 revolves with it and causes the perforated or gear-wheel 9 to revolve, which, being connected with the main spring in the manner described, winds up the main spring.

In order to prevent the backward unwinding of the main spring, a stop 17, made of a flat piece of metal or in other suitable manner, is interposed between gear-wheel 13 and the perforations or cogs of wheel 9. The stop 17, as shown in the drawings, forms the end of one arm of a bifurcated, flat piece of metal 18 which turns upon a pivot consisting, as shown, of a screw 19 entering the top of shaft 6. A washer 20, of metal or other suitable material, held down by screw 19, subjects the stop-piece or bifurcated piece of metal 18 to sufficient friction to cause it to revolve in either direction in which wheel 9 revolves.

In winding up the main spring in the manner above described, arm 21 of the bifurcated piece 18, by coming in contact with gear wheel 13, prevents the piece 18 from revolving or moving beyond a distance sufficient to carry stop 17 away from between wheel 13 and the perforations or cogs of wheel 9. Upon ceasing to wind up the main spring, the action of the main spring causes wheel 9 to begin to revolve in the opposite direction, carrying with it, by virtue of the friction described, the bifurcated piece 18, so that stop 17 returns to its position between gear-wheel 13 and the perforations or cogs of wheel 9, where it remains and prevents the backward unwinding of the main spring.

22 is a vertical shaft upon which two gear-wheels 23 and 24 revolve together. Gear-wheel 23 meshes with gear-wheel 7 and gear-wheel 24 meshes with gear-wheel 25, which revolves together with gear-wheel 26, causing vertical shaft 27 to revolve at the same time. Gear-wheel 26 meshes with gear-wheel 28 which causes governor 29, provided with disk 30, and vertical shaft 31 to revolve with it.

32 is a piece of leather or other suitable material carried by an arm 33 of a lever, the arm 33 being raised by the pressure of spring 34 or lowered by the movement of arm 35 or arm 36 of the lever-piece. Screw 42 in standard 41 forms the fulcrum for levers 35—33 and 36—33.

37 is a screw which turns in its bearing in standard 41 and may thus be brought to bear against arm 35 and lower the free end of arm 33.

38 is a flat piece of metal pivoted about the lower end of standard 41 and provided with a raised tongue 39 which, when brought in contact with arm 36, will also lower the free end of arm 33. The piece 38 moves over a slightly inclined piece of metal 40 which assists tongue 39 in elevating arm 36.

As is well understood, when the end of arm 33 is lowered and the piece of leather or other material 32 is brought to bear upon disk 30 of the governor 29, the speed of the revolving parts may be regulated as desired, or the motion of the parts may be stopped altogether. The screw 37 is used to regulate the machine so as to secure the desired, proper speed, while piece 38 is used in the ordinary starting and stopping of the machine in use for the recording or reproducing of sound.

Shaft 27, revolving as stated with gear-wheels 25 and 26, extends above plate 3 and carries at its upper end gear-wheel 43 which revolves with it and meshes with gear-wheel 44, which in turn meshes with gear-wheel 45 carried by the lower end of shaft K. Thus shaft K revolves by virtue of motion communicated from shaft 27 through gear-wheels 43, 44 and 45, and with shaft K plate C and tablet B revolve as above described.

N is a carriage which may, as shown, be formed of a bent, suitable strip of metal. The carriage N is pivoted at one end by means of a collar or sleeve 46 surrounding shaft 27 and fitting, revolubly, in the perforation in plate 3 through which the upper part of shaft 27 passes. The collar 46 is provided with projecting rings 47 and 48 above and below plate 3, respectively, in order to maintain it and parts connected with it in proper position. The lower ring 48 is detachable and held fast by a set-screw 49.

The carriage N carries the pivot for gear-wheel 44 and bearings for revoluble shaft K. As clearly shown in Fig. 8, carriage N is so bent or formed that it is elevated above plate 3 except at the end where it is pivoted. At the opposite end of the lower part of carriage N and secured beneath it, a sliding-rest O is provided, adapted to rest upon and slide over the surface of plate 3 and to support the weight of carriage N and parts carried by it, including revoluble shaft K, plate C and tablet B. Sliding-rest O may, if desired, be provided with one or more rollers, resting upon the surface of plate 3, to lessen friction.

Between plate 3 and carriage N is a flat fan-shaped piece of metal 50 which is pivoted at one end and held in position in the manner above described for carriage N. The pivoted ends of carriage N and of piece 50 are suitably secured together, as by friction, as shown or by making carriage N and piece 50 of one piece of metal so that carriage N and piece 50 revolve or move together. Piece 50 should, preferably, be approximately in the shape of a sector of a circle and be revoluble about the center of the circle and should, near its circumference, be provided with perforations 51, or otherwise adapted as by cogs, forming a rack, to engage with gear-wheel 52 carried by one end of shaft 53 and projecting partially above plate 3 through perforation 54. The top of gear-wheel 52 acts as a laterally-moving feed-piece to communicate lateral motion to carriage N and parts connected and movable therewith. Shaft 53 carries at its other end gear-wheel 55 which meshes with worm 8. Thus as the main spring, motor or other suitable source of power causes worm 8 to revolve, motion is communicated, through gear-wheels 55 and 52 carried by shaft 53 to the revoluble, metal-piece 50 which carries with it, as it moves, carriage N and parts carried by and movable with carriage N, all moving in arcs of circles having centers in shaft 27.

In the construction shown in the drawings the piece 50 moves from left to right, as viewed in Fig. 4, when motion is communicated thereto from the main spring. In order to secure the return to the starting point of piece 50 and parts moving therewith, carriage N is provided with a handle P and gear-wheel 52 is so mounted as to permit it to revolve on shaft 53 in one or both directions when shaft 53 is at rest or in motion and pressure is applied to a suitable point of wheel 52 for the purpose. In the construction shown in the drawings such revolution of wheel 52 is secured by mounting it upon shaft 53 in such manner that the friction at the bearing is sufficient to enable shaft 53 to cause wheel 52 to revolve with it and to impart motion to piece 50 and parts connected therewith but not sufficient to prevent the revolution of wheel 52 upon shaft 53 when pressure is applied in either direction by means of handle P which, operated by hand, communicates lateral motion to carriage N and piece 50 when and as desired.

From the foregoing description, the mode of operation of the phonograph, forming the subject-matter of this invention, in recording and reproducing sound, will be readily understood. After winding up the main spring in the manner described, a record-tablet, provided with a surface of material suitable for making therein a record of sound, or a record-tablet having a sound record already made thereon, is placed upon plate C, shaft K passing through a hole at the center of the record-tablet. By means of handle P, shaft K is moved laterally to right or left with carriage N and connected parts in the manner described, until a desired, proper position of record-tablet B is obtained, which position may be one where stylus s will, upon being lowered, rest near the circumference of record-tablet B. If the record-tablet carries a record made thereon, stylus s will adjust itself to the record-groove. Screw 37 and metal piece 38 being properly adjusted as described, wheel 30 is relieved from the pressure of the piece of leather 32 carried by lever-arm 33 and the phonograph is set in motion by the action of the main spring. Record-tablet B thereupon revolves with the revolution of shaft K in the manner described and is simultaneously moved across and fed to the point of stylus s by reason of the lateral motion communicated to revolving shaft K through worm 8, shaft 53, wheel 52, carriage N and piece 50 with which carriage N is provided. If the record-tablet B employed was provided with a surface of suitable, recording material when the phonograph was set in motion and if sound-waves pass through the horn I and impinge upon the diaphragm of sound-box J, stylus s will vibrate laterally or vertically, according to the form of sound-box employed, as is well understood, and will form in the recording material, a spiral groove of lateral or vertical undulations, constituting a sound-record. The spiral-groove constituting the sound-record may begin near the circumference and end near the center of the record-tablet B or may begin near the center and end near the circumference thereof or be otherwise formed as desired. If, on the other hand, the record-tablet B employed had a sound-record already made thereon when the phonograph was set in motion, stylus s, upon being lowered, will adjust itself to the record-groove and the lateral or vertical undulations of the record-groove will cause the stylus to vibrate and communicate its vibrations to the diaphragm of sound-box J and thus reproduce the sounds originally recorded.

As above stated, shaft K, in addition to revolving, moves laterally in the arc of a circle while the phonograph is in operation. The lateral motion in the arc of a circle to be communicated to revolving shaft K is determined by the lateral movement necessary to feed the revolving record-tablet B, provided with a surface of suitable, recording-material or having a sound-record made thereon, to the point of the stylus. In other words, at all times during one revolution of the recording-tablet B, shaft K is moved laterally in the arc of a circle a distance sufficient to feed the revolving, spiral record-groove of a sound-record continuously to the point of the stylus. This adjustment of the lateral movement of shaft K and of the spiral line of the record-groove is secured in a phonograph made according to this invention by the proper adjustment of the above mentioned parts, which communicate the lateral motion referred to from the main spring, and depends mainly, as will be well understood, upon wheel 55 and upon the relation existing between the circumferential rack, with which piece 50 is provided, and wheel 52. The extent of the required lateral movement of shaft K, during one revolution of record-tablet B, being determined with reference to the distance between adjacent parts or threads of a spiral record-groove, whether in reproducing sound from a given record or in recording sound by making a spiral record-groove, or, in other words, being determined by the pitch of the spiral line of the record-groove, the proper adjustment for the purpose of the necessary parts is readily made, as is well understood. Obviously, any adjustment employed in recording records of sound will be suitable for reproducing sound from a record made with that adjustment, but the adjustment should, preferably be such that in recording, for example, the surface of the recording material upon tablet B will be fed to stylus s so that in the spiral record-groove, when made, there will be approximately from 85-100 threads to the inch, measuring along a radius of a disk record-tablet.

The advantages of a phonograph made in accordance with this invention will be clear to those skilled in the art to which it appertains. By it there is obtained a practical sound-recording and sound-reproducing apparatus, which can be constructed at small cost and without difficulty. Moreover, in the reproduction of sound, by means of a phonograph embodying this invention, from sound-records, the record-groove passes across and is fed to the point of the stylus and the wear of the record caused in phonographs wherein the record-groove propels the stylus across the face of the record by means of the pressure exerted upon the stylus by the walls of the record-groove is obviated.

What we claim is:—

1. In a phonograph, the combination of a record-tablet, a revoluble shaft carrying the record-tablet, a pivoted carriage carrying the revoluble shaft, and a laterally-movable feed-piece to communicate lateral motion to the pivoted carriage and cause the revoluble shaft and record-tablet to be moved in arcs of circles, substantially as described.

2. In a phonograph, the combination of a stylus, a record-tablet, a revoluble shaft carrying the record-tablet, a pivoted carriage carrying the revoluble shaft, and a laterally-movable feed-piece to communicate lateral motion to the pivoted carriage and cause the revoluble shaft and record-tablet to be moved in arcs of circles, substantially as described.

3. In a phonograph, the combination of a stylus, a tablet having a sound-record formed thereon, a revoluble shaft carrying said tablet, a pivoted carriage carrying the revoluble shaft, and a laterally-movable feed-piece to communicate lateral motion to the pivoted carriage and cause the revoluble shaft and record-tablet to be moved in arcs of circles, substantially as described.

4. In a phonograph, the combination of a record-tablet, a revoluble shaft carrying the record-tablet, a pivoted carriage carrying the revoluble shaft and provided with rotatable wheels to revolve the shaft, and a laterally-movable feed-piece to communicate lateral motion to the pivoted carriage and cause the revoluble shaft and record-tablet to be moved in arcs of circles, substantially as described.

5. In a phonograph, the combination of a revoluble shaft, a pivoted carriage bearing the shaft, a plate and a sliding-rest attached to the carriage and touching the surface of the plate, substantially as described.

6. In a phonograph, the combination of a revoluble shaft, a pivoted carriage bearing the shaft and rotatable parts to revolve the shaft, a plate and a sliding-rest attached to the carriage and touching the surface of the plate, substantially as described.

7. In a phonograph, the combination of a revoluble shaft, a pivoted carriage bearing the shaft, a pivoted piece provided with a rack, and a revoluble gear-wheel meshing with the rack, substantially as described.

8. In a phonograph, the combination of a revoluble shaft, a pivoted carriage bearing the shaft and a revoluble wheel bearing, at points in the arc of a circle, upon a rack with which the pivoted carriage is provided, substantially as described.

9. In a phonograph, the combination of a revoluble shaft, a pivoted carriage bearing the shaft, a wheel revoluble in both directions bearing upon a rack with which the pivoted carriage is provided and a handle to move the carriage upon its pivot, substantially as described.

10. In a phonograph, the combination of a motor, a revoluble, stationary shaft receiving motion from the motor, a carriage pivoted about said shaft, and a revoluble shaft mounted on the pivoted carriage and receiving motion from the stationary shaft, substantially as described.

11. In a phonograph, the combination of a motor, a revoluble, stationary shaft receiving motion from the motor, a pivoted carriage, a revoluble shaft mounted on the pivoted carriage and receiving motion from the stationary shaft, and a revoluble wheel receiving motion from the motor and imparting another motion to the carriage about its pivot, substantially as described.

12. In a phonograph, the combination of a motor, a worm, a pivoted rack, a shaft provided with two wheels, one of which is in contact with the worm and the other of which is in contact with the pivoted rack, and a pivoted carriage revoluble by the rack, substantially as described.

13. In a phonograph, a pivoted carriage provided with a revoluble shaft and a sliding-rest, substantially as described.

14. In a phonograph, a pivoted carriage provided with a revoluble shaft, a sliding-rest and a handle, substantially as described.

15. In a phonograph, the combination of a plate, a motor below the plate, a stationary, revoluble shaft receiving motion from the motor below the plate and passing through the plate, and a pivoted carriage above the plate provided with a revoluble shaft receiving motion from the stationary shaft, substantially as described.

16. In a phonograph, the combination of a plate and below the plate a worm and shaft provided with two wheels, one of which is in contact with the worm, and above the plate a pivoted carriage provided with a revoluble shaft, and a rack in contact with one of the wheels carried by said shaft below the plate, substantially as described.

17. In a phonograph, the combination of a revoluble shaft, a revoluble record-tablet receiving motion from the shaft, a rack secured to the shaft, a wheel in contact with the rack and a stop-piece interposed between the wheel and rack, substantially as described.

18. In a phonograph, the combination of a revoluble shaft, a revoluble record-tablet receiving motion from the shaft, a rack carried by the shaft, a wheel in contact with the rack and a bifurcated stop-piece, one arm of which is interposed between the wheel and rack and the other arm of which extends to one side of the wheel, substantially as described.

19. In a phonograph, the combination of a revoluble shaft, a revoluble record-tablet receiving motion from the shaft, a rack carried by the shaft, a wheel in contact with the rack and a stop-piece pivoted about the shaft and interposed between the wheel and rack, substantially as described.

20. In a phonograph, the combination of a revoluble shaft, a revoluble record-tablet receiving motion from the shaft, a rack carried by the shaft, a wheel in contact with the rack and a pivoted stop-piece, of which the pivoted end is in frictional connection with the rack and revoluble therewith and of which the free end is interposed between the wheel and rack, substantially as described.

21. In a phonograph, the combination of a revoluble shaft, a revoluble record-tablet receiving motion from the shaft, a rack carried by the shaft, a wheel in contact with the rack and a pivoted, bifurcated stop-piece, of which the pivoted end is in frictional connection with the rack and revoluble therewith and of which one arm is interposed between the wheel and rack while the other arm extends to one side of the wheel, substantially as described.

22. In a phonograph, the combination of a pivoted carriage provided with a revoluble shaft and with a rack, and a wheel engaging the rack and revoluble by pressure exerted through the rack, substantially as described.

23. In a phonograph, the combination of a record-tablet, a revoluble shaft, a pivoted carriage bearing the shaft, a laterally movable feed-piece to communicate lateral motion to the pivoted carriage and cause the revoluble shaft and record-tablet to be moved in arcs of circles, a stylus and a mounting for the stylus which permits a slight lateral movement of the stylus and thereby an adjustment of the stylus to a record-groove, substantially as described.

24. In a phonograph, the combination of a record-tablet, a revoluble shaft, a pivoted carriage bearing the shaft, a laterally movable feed-piece to communicate lateral motion to the pivoted carriage and cause the revoluble shaft and record-tablet to be moved in arcs of circles, a sound-box provided with a stylus, and a flexible tube connected with the sound-box which permits a slight lateral motion of the stylus and thereby an adjustment of the stylus to a record-groove, substantially as described.

In witness whereof we have hereunto set our hands this 15th day of January, 1908.

EDWARD F. LEEDS.
GEORGE RUMPF.

Witnesses:
LEO MOELLER,
JOS. ISAAC.